July 27, 1926.
A. PLUMMER
1,593,671
PROTRACTOR ATTACHMENT FOR LENS MEASURES
Filed April 27, 1925
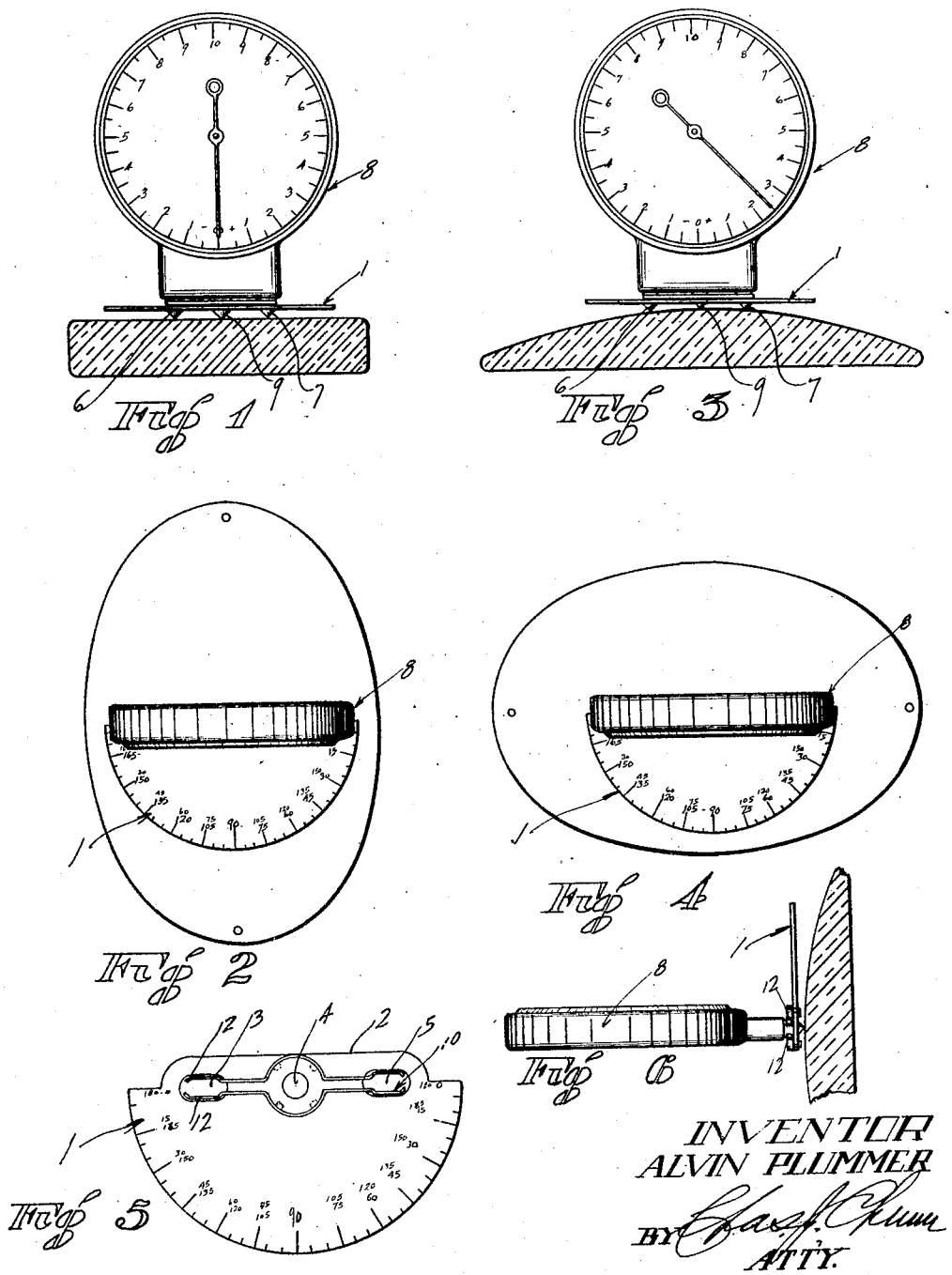
INVENTOR
ALVIN PLUMMER Patented July 27, 1926.

1,593,671

UNITED STATES PATENT OFFICE.

ALVIN PLUMMER, OF SAN FRANCISCO, CALIFORNIA.

PROTRACTOR ATTACHMENT FOR LENS MEASURES.

Application filed April 27, 1925. Serial No. 26,067.

This invention relates to a protractor attachment for lens measuring instruments such as are commonly employed in optometrical work, the primary purpose being to provide a simple and readily attachable means for quickly determining the true axis of the "cylinder" formed by the curved surface of an eye glass or other lens, in order that expeditious and accurate fitting or reproduction of lenses may be carried out and to otherwise generally insure optometrical accuracy.

Another purpose of the invention is to provide a simply constructed and inexpensive attachment of the character described which is provided with a means for holding it in place upon the lens measuring instrument.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing;

Fig. 1 represents a front elevation of a lens measuring instrument showing it as when applied to a lens with the device of my invention mounted thereon.

Fig. 2 represents a top plan view of the measuring attachment and lens as shown in Fig. 1.

Fig. 3 represents a front elevation of the lens measure showing it as when determining the maximum curvature of the surface of the lens, the lens being then at right angles to the position shown in Figs. 1 and 2.

Fig. 4 represents a top plan view of the measure and lens as when in position shown in Fig. 3.

Fig. 5 represents a top plan view of the protractor removed from the measuring device.

Fig. 6 represents a side elevation of the measuring device with the protractor thereon.

The device of my invention comprises a small protractor generally designated 1 having on its lower straight edge an extension 2 in which are provided three openings 3, 4 and 5. The openings 3 and 5 are elongated whereas the opening 4 is circular. The openings 3 and 5 are adapted to receive the pointed stationary projections 6 and 7 of a lens measure, generally designated 8, whereas the opening 4 is adapted to receive the slidable spring urged projection 9 disposed between the stationary projections. This disposes the protractor at right angles to the dial face of the lens measure and with the rear face of the protractor spaced inwardly from the points of the measuring projections so that said points may be brought to bear upon the surface of the lens to be measured. The calibrated face of the protractor is disposed so that it may be seen when viewing the dial face of the lens measure. A protractor constructed as shown and described, may be readily applied to the ordinary lens measure and removed therefrom with equal facility. The protractor is held in upright position or in othe words at right angles to the projections 3, 4 and 5 and against being accidentally dislodged, by a clamp 10 composed of opposed spring jaws 12 having bendable lugs inserted through the protractor and bent over on the rear face thereof. The intermediate portions of the jaws are bent arcuately to avoid the central opening 4 in the protractor, whereas the end portions of the jaws are shaped so as to yieldingly engage opposite sides of the stationary projections when the latter are inserted through the openings 3 and 5.

When it is desired to determine the axis of the cylinder formed by the curved surface of the lens and to provide for efficaciously marking the lens to indicate the axis, the operator places the three projections on the surface of the lens to be measured and gives the measure or lens, preferably the latter, a rotary motion while keeping the three projections engaged on the lens surface. This operation determines the points of maximum and minimum curvature of the said lens surface as will be noted upon reading the dial of the lens measuring device. These indications when taken into consideration with similar indications derived from measuring the reverse side of the lens, permit of readily determining the line of axis of the cylinder. On determining the line of axis of the cylinder with the instrument in position to determine said axis, the protractor is read with relation to a predetermined point on the lens, for example, the point of attaching the lens to the frame and the degree an angularity or in other words the line of the axis of the cylinder may be readily noted with relation to the lens and a mark made on the lens if desired.

Thus, it will be seen that by the protractor attachment of my invention, I am able to quickly and easily determine the axis of the cylinder formed by the curved surface of the lens so that the reproduction of and fitting of lenses will be greatly facilitated.

As shown in Figs. 1 and 2, the lens and measure are in such position that no curvature of the lens is indicated. In this instance, the axis of the cylinder is determined and on reading the protractor with the instrument shown in said figures with relation to the point of mounting of the lens, the axis may be arbitrarily termed a 90° axis.

As shown in Figs. 3 and 4, the measure and lens are in position as when the maximum curvature of the lens is indicated, the lens then being at right angles to the position it assumes with relation to the measure when the axis of the cylinder is determined.

I claim:

1. In combination with a len measuring device having projections adapted to be moved over the surface of the lens to be measured, of a protractor and means on said protractor for removably supporting the protractor upon the projections, which means comprises spring jaws engaging certain of the projections, said protractor having openings therein through which said projections extend.

2. In combination with a lens measuring device having projections adapted to be moved over the surface of the lens to be measured, of a protractor and means on said protractor for removably supporting the protractor upon said projections, which means includes spring jaws adapted to engage the lens measuring device, said protractor having openings therein through which the projections extend.

ALVIN PLUMMER.